Patented Jan. 18, 1949

2,459,777

UNITED STATES PATENT OFFICE 2,459,777

PROCESS OF MAKING QUINACRINE

Gail L. Shaw and Reuben G. Jones, Indianapolis, Ind., assignors to Eli Lilly and Company, Indianapolis, Ind., a corporation of Indiana No Drawing. Application July 17, 1944,
Serial No. 545,410

5 Claims. (Cl. 260—279)

Our invention relates to the manufacture of quinacrine.

It is the object of our invention to simplify the process of manufacturing quinacrine; to obtain an increased yield; to effect a saving in chemicals used; to avoid certain process steps heretofore deemed necessary; to make it possible to carry out the complete process to the point of an effective separation of the quinacrine, in a single vessel; to obtain an effective separation of the quinacrine directly from the reaction mixture in which it is formed; and to facilitate the obtaining of quinacrine of high purity.

In the manufacture of quinacrine, as is known, 1-diethyl-amino-4-aminopentane and 2-methoxy-6,9-dichloroacridine are caused to react in the presence of an excess of phenol, heretofore a several-fold excess, at temperatures usually in the range of 100–130° C. Heretofore it has not been known how to get directly from that reaction mixture the quinacrine that is produced by that reaction, for the reaction mixture is a gummy mass; and so it has been necessary to use roundabout procedures.

In one such known procedure, the reaction mixture is diluted with a large volume of acetone, and hydrochloric acid is added. This causes the formation of crystals of quinacrine hydrochloride; which are filtered off, washed with acetone, and dissolved in water. The water solution so obtained is filtered, and the quinacrine hydrochloride is precipitated from the filtrate by the addition of an excess of hydrochloric acid; and the precipitate is collected on a filter, washed with acetone, and dried.

In another such known procedure, the reaction mixture containing the quinacrine is treated with a 2N aqueous solution of sodium hydroxide; which dissolves some of the material copresent with the quinacrine, in part by converting that copresent material into soluble sodium salts, such as sodium phenate and sodium chloride. But in this procedure the resultant mixture forms a rather persistent emulsion, which will not separate effectively into layers, and it is impractical to get quinacrine directly from it in substantial yields. To obtain the quinacrine in that procedure it has been the practice to add ether to the mixture to dissolve the quinacrine from it, then to let the whole stand so that it will separate into an upper ether layer containing the quinacrine and a lower aqueous layer containing the sodium phenate and sodium chloride, to remove the ether layer and extract the quinacrine from it with dilute acetic acid, and to precipitate the quinacrine from the acetic acid solution by treating the latter with ammonia; following which the precipitated quinacrine is redissolved in ether, and the ethereal solution of the quinacrine is treated with an ethereal solution of hydrochloric acid to produce precipitation of quinacrine hydrochloride.

By our invention we eliminate these complications of procedure. As in the procedure last referred to, we also add sodium hydroxide, and water, to the reaction mixture, conveniently but not necessarily together in the form of an aqueous solution of sodium hydroxide; to convert to their sodium salts the phenol and hydrochloric acid present in the reaction mixture. We desirably use enough sodium hydroxide to effect such conversion of all the phenol and all the hydrochloric acid present, to insure which involves the use of some excess of sodium hydroxide. In doing this, we have discovered the surprising fact that by suitably varying the ratio of sodium hydroxide to the water present not only can we avoid the formation of the emulsion which in the previous procedure has been an obstacle that seemed insuperable, but we can get an effective separation into layers, by the removal of one from the other of which it becomes possible to get the quinacrine almost directly without the complications of previous procedures and with very high yields. Exploring this discovery, we find that to get the desired formation of distinct aqueous and quinacrine layers the amount of water used must be such that the aqueous solution which is formed of the sodium salts and the excess sodium hydroxide above referred to, after heating, stirring, and cooling, will have a specific gravity sufficiently different from that of the quinacrine that a clean separation between the two takes place effectively and promptly, forming in this way the distinct aqueous and quinacrine layers.

The specific gravity of the aqueous layer may be either greater or less than that of the quinacrine; although we prefer to have it less, so that the concentration of salts and sodium hydroxide in it may not be too great for convenient handling. In general, the amount of water added is such that the specific gravity of the aqueous layer will be outside the range of 1.062 to 1.130. We prefer that the specific gravity of the aqueous layer be below the low end of this range rather than above the high end of it—that is, below 1.062—and we desirably work well below the low end of that range, most desirably with the specific gravity of the water layer below 1.050 or (still better) even below 1.040.

After obtaining the separation into two layers—the water layer containing the salts, and the oily layer consisting of the crude quinacrine—we suitably remove the water layer, as by pumping it off or decanting it. We have discovered that we can effectively wash this remaining quinacrine layer with water, to remove various water-soluble impurities; and that the washed oily quinacrine layer will separate effectively and cleanly and quickly from the water used in such washing. In doing the washing with water, we add several volumes of water and heat to about 80° C., with stirring, and then cool to effect separation of the quinacrine from the supernatant layer of wash water; which may be removed in convenient manner, as by pumping or decanting. This washing procedure may be repeated one or more times as desired.

In this way we obtain the free quinacrine base directly from the reaction mixture in which it is formed, by a simple gravity separation. The free quinacrine base may be converted into any desired salt, if it is desired to do so. For instance, if quinacrine hydrochloride is desired, the base may be converted into the hydrochloride by treatment with hydrochloric acid, in known manner.

In our process we find it advantageous to use a much smaller excess of phenol than has heretofore been used; for we use only a slight excess, of not to exceed 50% and desirably not to exceed 30%, beyond the amount molecularly equivalent to the 2-methoxy-6,9-dichloroacridine used, instead of the several-fold excess which has heretofore been universal. By thus reducing the excess of phenol used, we reduce the volume of liquids that it is necessary to handle, for we reduce the quantity of salts that are formed; and incidentally we effect a saving in reagents.

The following is an example of our process:

A mixture of four pounds of phenol, 9.27 pounds of 2-methoxy-6,9-dichloroacridine, and 6.2 pounds of 85 percent 1-diethylamino-4-aminopentane is agitated for about one or two hours, during which time it is held at a temperature of about 105–115° C. Then, while maintaining the mixture hot, 7.8 gallons of water and 3 pounds of 96 percent caustic soda are added, permissibly separately but desirably with the caustic soda dissolved in the water. After the addition of water and caustic soda, the mixture is agitated for about an hour, while being maintained at a temperature of 80–85° C.; after which the mixture is cooled to about 40° C., agitation is stopped to allow the separation into layers above referred to, with the quinacrine free base below as the heavier layer and an aqueous solution of salts and sodium hydroxide above as the lighter layer; and the upper aqueous layer is drawn off. Eight gallons of water are added to the remaining oily layer, which is for the most part the desired quinacrine free base; and the whole is agitated for about an hour to produce thorough mixing and meanwhile is maintained at a temperature of about 80–85° C.; after which the mixture is cooled to about 40° C., and agitation is stopped. The free base separates in an oily lower layer, and the upper aqueous layer containing the impurities which the water has taken up is drawn off. This washing with water may be repeated one or more times. After the final washing, 8 gallons of water are added, and with it 8 pounds of 36 percent hydrochloric acid, and the whole is heated to about 80° C., with agitation. This converts the free base into the hydrochloride, in water solution. Desirably the agitation is continued for about two hours. At the end of this time the pH is adjusted to between 3.8 and 4.8, by the addition of either hydrochloric acid or sodium hydroxide as necessary. Then two or three pounds of activated carbon is added, agitation at 80° C. is continued for about an additional hour, and the mixture is then cooled to somewhat below 40° C.; after which cooling the agitation is continued for about an hour longer. Then the whole is heated to about 55–58° C., and filtered to remove the carbon and other water-insoluble material. The filtrate is reheated to 55–60° C.; and 2.8 pounds of 36 percent hydrochloric acid are added, to lower the pH of the mixture and thereby to make the quinacrine hydrochloride less soluble. Then the mixture is cooled to 5–10° C, to cause the quinacrine hydrochloride to separate out in large measure, in crystalline form. The crystals so obtained are essentially pure quinacrine dihydrochloride; and are recovered in suitable manner, as by being collected on a filter. The crystals are desirably washed with acetone, as by being slurried with about 36 pounds of acetone, after which they are collected on a filter. This acetone-washing step may be and desirably is repeated at least once. The quinacrine dihydrochloride crystals thus obtained are dried in air for about 15–20 hours at 50° C.

The yield of quinacrine hydrochloride is about 80–85 percent of the theoretical, varying with the quality of the reactants used.

We claim as our invention:

1. The process of producing quinacrine which comprises reacting 2-methoxy-6,9-dichloroacridine and 1-diethylaminoethyl-4-aminopentane in the presence of at least one molecular equivalent of phenol relative to the amount of 2-methoxy-6,9-dichloroacridine used; treating the reaction mixture with sodium hydroxide and water in amounts sufficient to produce an alkaline aqueous layer having a specific gravity outside the range of about 1.062 to about 1.130; and separating the quinacrine as an oil.

2. In the method of producing quinacrine in accordance with claim 1, the step of treating the reaction mixture with sodium hydroxide and water in amounts sufficient to produce an alkaline aqueous layer having a specific gravity less than about 1.062.

3. In the method of producing quinacrine in accordance with claim 1, the step of treating the reaction mixture with sodium hydroxide and water in amounts sufficient to produce an alkaline aqueous layer having a specific gravity less than about 1.050.

4. In the method of producing quinacrine in accordance with claim 1, the step of treating the reaction mixture with sodium hydroxide and water in amounts sufficient to produce an alkaline aqueous layer having a specific gravity less than about 1.040.

5. In the process of producing quinacrine; the steps comprising reacting 2-methoxy-6,9-dichloroacridine and 1-diethylamino-4-aminopentane in the presence of at least 1 but not more than about 1.5 molar equivalents of phenol relative to the amount of 2-methoxy-6,9-dichloroacridine used; treating the reaction mixture with sodium hydroxide to liberate quinacrine from combination as a salt and to react with acidic substances present, and with water sufficient to produce an aqueous layer having a specific gravity outside the range of about 1.062 to about 1.130; and separating the quinacrine as an oil.

GAIL L. SHAW.
REUBEN G. JONES.

REFERENCES CITED

The following references are of record in the file of this patent:

UNITED STATES PATENTS

| Number | Name | Date |
|---|---|---|
| 2,121,207 | Mietzsch et al. | June 21, 1938 |

OTHER REFERENCES

Basu et al., Jour. Indian Chem. Soc., vol. 14, pages 468–471.